April 20, 1937.  E. G. BUDD  2,078,191
RAIL CAR WHEEL
Filed March 16, 1934
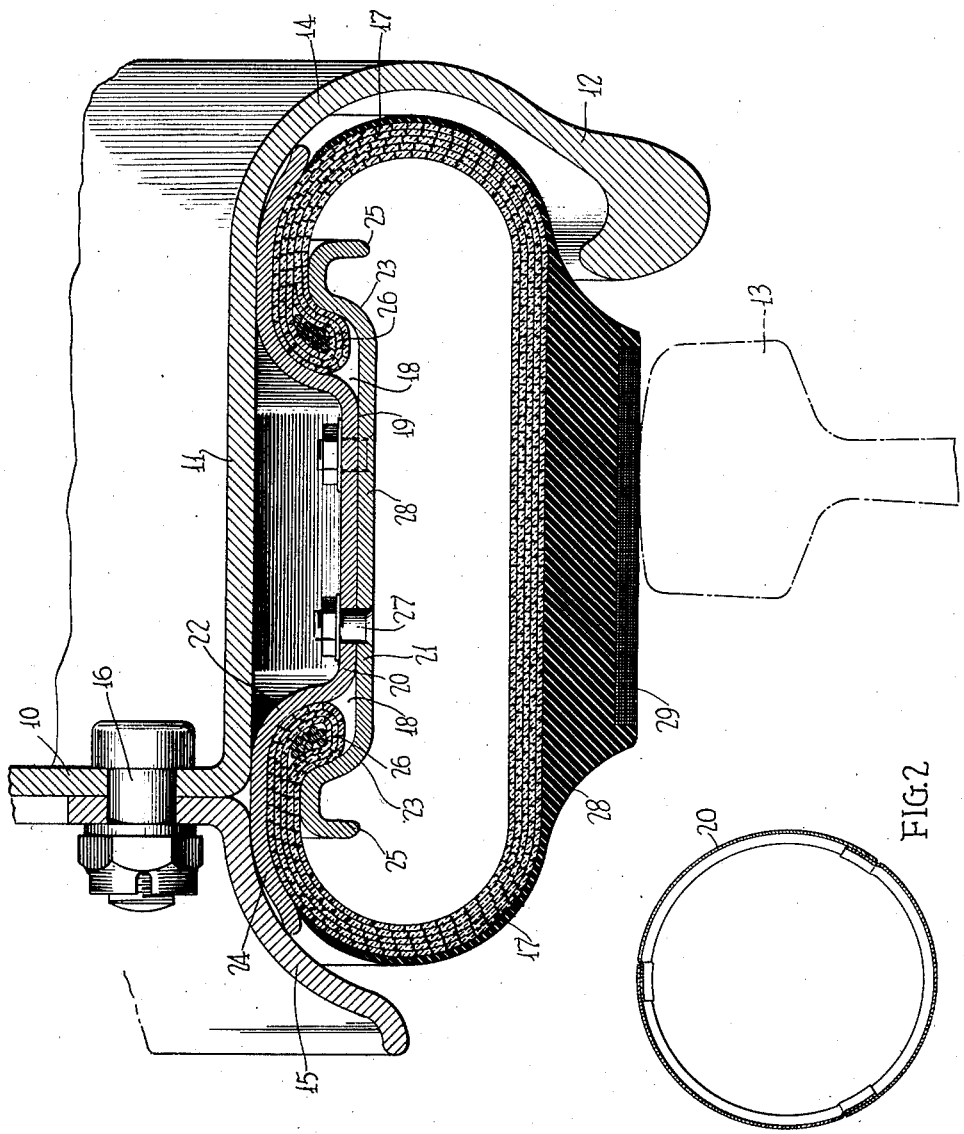
INVENTOR.
EDWARD G. BUDD.
BY
ATTORNEY.

Patented Apr. 20, 1937

2,078,191

UNITED STATES PATENT OFFICE 2,078,191

RAIL CAR WHEEL

Edward G. Budd, Philadelphia, Pa., assignor to Edward G. Budd Manufacturing Company, Philadelphia, Pa., a corporation of Pennsylvania Application March 16, 1934, Serial No. 715,852

3 Claims. (Cl. 295—31)

The present invention relates in general to pneumatic tired rail car wheels and has as its chief object to improve the wearing quality of such tires and render them capable of carrying higher loads on long continuous runs without deterioration from overheating, by providing for the conduction of heat away from the rubber walls of the tire at a rate sufficient to offset the tendency to overheating under the extremely high loading pressures which obtain in the use of pneumatic tires on rail cars. Such load is of unusual magnitude due to the high ratio of load to area of contact between the tire and the rail head as compared to the area of contact between the ordinary automobile tire and a flat roadway.

It has been found in the practice to which the present invention pertains, that the operating load could be considerably increased but for the fact that with tires as heretofore constructed, the heat developed by repeated flexure of the tire under such increased loads at high speeds during long runs would raise the temperature to a degree where the material of the tire would rapidly deteriorate. Thus the attainment of the above object of providing for conduction of heat away from the tire walls, makes possible the use of higher loads.

In the use of pneumatic rail car wheels, especially under the higher loads here contemplated, it is of great importance, in the event of deflation, that the wheel drop be limited to an amount insufficient to permit the wheel flange to drop below the rail head or engage trackage equipment such as fish plates and rail bonds situated near the side of the rail head. An ancillary object therefor is to provide a limit drop sufficiently sturdy to support the load but so embodied in common with other necessary parts as to reduce the accompanying additional weight to a minimum.

The above objects are attained by the provision of a tire casing of substantially conventional construction having a wide annular opening or gap in its inner wall bridged by a metallic rim or wall section arranged to make thermal contact with the metallic rim of the wheel over an extended area and having a substantial portion offset or reentrant into the air space of the tire. The rim bridging the annular opening in the tire wall thus in effect forms a metallic inner wall for the tire with integral portions in direct thermal contact over an extended area with the air space in the tire and the metallic body material of the wheel. By making the opening in the inner tire wall of substantial width, considerable saving in rubber is effected with the omission of rubber from parts only where flexibility is not necessary. By making the tire rim member of pressed metal with a portion offset into the air space of the tire a rigid strong limit drop ring is formed with minimum increase in weight.

While the invention is particularly directed to the solution of problems arising in rail car operation as above set forth, its adaptability to and usefulness in other fields of transportation will be obvious.

A preferred embodiment of the invention is illustrated in the accompanying drawing in which:

Fig. 1 is a fragmentary vertical section.

Fig. 2 is a small scale, side view of the inner annulus.

Referring to the drawing, the wheel body 10 which may be of any known or other suitable form of metallic wheel body, is provided with a wide wheel felly 11 carrying a guide flange 12 arranged to cooperate with the side of the rail head 13 for guiding the wheel over the rail. The side portion 14 where the flange joins the wheel felly forms the fixed inner tire retaining flange of the felly while the outer edge of the felly is provided with a removable retaining ring 15. The retaining ring 15 is secured to the wheel body 10 by a suitable bolt and nut fastening means 16.

Fitted on the wheel felly 11 is my improved cool running tire 17 comprising a tire casing of substantially conventional construction except that the radial inner wall of the tire is provided with a wide annular opening 18 bridged by a metallic rim or wall section 19. This wall section 19 consists of a pair of sheet metal annuli 20 and 21, the outer one 21 being continuous and the inner one 20 sectional as shown in Fig. 2, for a purpose which will later appear. Both annuli are of inwardly facing flanged channel section secured together in nested relation with the bottoms of the channels in direct thermal contact and the adjacent sides 22—23 and flanges 24—25, spaced apart in substantially parallel relation and receiving within said space the marginal edges 26 of the opening 18. The nested annuli 20—21 are secured together with their juxtaposed surfaces in good thermal contact throughout by means of bolts 27.

By forming the annuli in channel section as shown the central portion of the metallic rim or inner wall member 19 is offset into the air space of the tire. This offset is made of sufficient radial depth in relation to the radial depth of the inner surface of the tread wall to provide a limit drop member 28 in the form of a limit drop ring extending radially outwardly into the air space of the tire and in direct contact with the air in the tire. The purpose of such limit drop is to limit the drop of the wheel, in the event of deflation, to an amount insufficient to permit the wheel flange to be damaged or interfered with by trackage equipment, such as fish plates and rail bonds situated near the side of the rail head, and to prevent undue flattening or distortion of the tire casing.

To augment the transfer of heat from the tire and from the air within the tire to the metal body of the wheel, the edges of the flanges 25 are extended radially outwardly into the air space in the tire to increase the area of contact between the interior air and the rim, while the flanges 24 of the inner annulus 20 are extended axially a considerable distance to afford a large area of contact with the metallic felly 11, and retaining ring 15.

The tread wall of the tire is provided with a thickened rubber tread portion 28 with a width considerably greater than the width of the rail head to allow for lateral movement of the tire on the rail head, and give an increased effective tread area. To increase the wearing quality and render the tread portion substantially inexpansible radially while preserving its flexibility, the tread portion is provided with a reinforcing flexible belting 29, preferably like that described in my co-pending application, Serial 677,190, filed June 23, 1933, and comprising a flexible but substantially inexpansible belt fabricated of metallic strands or suitable strong fibrous material, inserted in the tread portion of the tires. This or other like form of reinforcement for the tread is of special importance in a tire of the present flatish cross section to enable the tire to withstand the high pressure required in use without strain or undue distortion of shape.

From the above it will be clear that substantially the entire inner wall of the tire is metal with a large portion of its area in direct thermal contact with both the metallic wheel body and the central portion of the air space in the tire thus affording rapid conduction of heat from the interior of the tire to the metal wheel body. It will also be noted that by forming the tire rim or wall portion 19 of sheet metal in channel section a strong effective limit drop is formed without substantial addition of material and weight.

For assembling the parts of the tire during construction, the radially outer annulus 21 may be put in place through the wide opening in the inner wall of the tire casing by spreading the beaded marginal edges apart axially, the flexible side walls permitting this. The radially inner annulus 20 may now be placed inside the outer annulus overlapping the marginal edges 26 of the tire walls, the annulus 20 being made in three sections for this purpose. Each section of the ring 20 is then secured in place by tightening up the bolts 27 to bring the rings 20 and 21 into intimate thermal contact and clamp the beaded marginal edges 25 of the tire between the flanges 24—25, the flange 25 being made with sufficient resilience to permit the annuli to be brought into contact after clamping the tire between the flanges. To further insure an air tight joint between the edges of the opening in the tire and the clamping flanges, a suitable cement may be applied to the contacting surfaces before assembling and clamping.

From inspection of the drawing it will be clear that by removing the retaining flange 15, the tire may be removed from the wheel without having to disassemble the tire or break the air seal thereof.

While I have thus shown and described a specific embodiment of the invention for the sake of disclosure, it is to be understood that the invention is not limited to such specific embodiment, but contemplates all such modifications and variations thereof as fall fairly within the scope of the appended claims.

What I claim is:

1. A pneumatic tired wheel for railway vehicles comprising a metallic wheel felly, a tire casing having a wide annular opening in its inner wall, a pair of sheet metal annuli of inwardly facing flanged channel section secured together in nested relation with the bottoms of the channels in direct thermal contact and the adjacent sides and flanges spaced in substantial parallel relation in transverse section, the marginal edges of the inner wall of said casing along the said annular opening being clamped between the said adjacent sides and flanges, the flanges of the inner annulus being arranged in thermal contact with the wheel felly.

2. A pneumatic tired wheel for railway vehicles comprising a wheel body having a felly, and a pneumatic tire casing carried by a metallic rim demountably secured upon and in direct thermal contact with said felly, said rim comprising a pair of annuli, the outer annulus having its edges and central portions offset to present a substantial surface in direct thermal contact with the inflating medium within said tire, the inner annulus collapsibly nested into engagement with said outer annulus at its central portion and hermetically clamping said tire casing at its marginal portions.

3. A pneumatic tired wheel for railway vehicles, comprising a metallic wheel felly, a tire casing having a wide annular opening in its inner wall, a pair of sheet metal annuli secured together in direct thermal contact with their adjacent marginal edges spaced in substantially parallel relation in transverse section, the marginal edges of the inner wall of said casing along the said annular opening being clamped directly between the said adjacent marginal edges of the annuli, the marginal edges of the inner annulus being arranged in thermal contact with the wheel felly.

EDWARD G. BUDD.